United States Patent [19]
Stradella et al.

[11] 4,164,196
[45] Aug. 14, 1979

[54] PRESSURE GAUGE OR PRESSURE INDICATOR HAVING AXIALLY-OPERATING INTERNAL MEMBERS WITH VISUAL INDICATION

[76] Inventors: Fabio Stradella; Cinzia Stradella, both of Piazza S. Giovanni Bono, 39/12, Recco, Genoa, Italy

[21] Appl. No.: 847,700

[22] Filed: Nov. 2, 1977

[30] Foreign Application Priority Data

Mar. 25, 1977 [IT] Italy ................................ 12527 A/77
Jun. 13, 1977 [IT] Italy ................................ 12637 A/77

[51] Int. Cl.$^2$ ................................................ G01L 7/16
[52] U.S. Cl. ........................................ 116/272; 73/744
[58] Field of Search ......... 116/114 PV, 114 S, 124 A, 116/70; 73/744, 715, 700, 124 D; 350/112, 198

[56] References Cited

U.S. PATENT DOCUMENTS

| | | | |
|---|---|---|---|
| 2,711,711 | 6/1955 | Harman | 350/112 |
| 2,827,122 | 3/1958 | Clark | 116/114 S |
| 2,850,900 | 9/1958 | Billington | 73/715 |
| 3,181,496 | 5/1965 | Bilbrey | 116/70 |
| 3,501,959 | 3/1970 | Womack | 73/715 |

FOREIGN PATENT DOCUMENTS

477781 1/1938 United Kingdom ..................... 350/112

*Primary Examiner*—S. Clement Swisher
*Assistant Examiner*—Denis E. Corr
*Attorney, Agent, or Firm*—Jacobs & Jacobs

[57] ABSTRACT

A pressure gauge without Bourdon tubular spring and associated traditional mechanism, which members are replaced by a simplified system comprising a plurality of differently-colored plungers slidably telescoped in one another and projecting into a transparent head member having such a geometrical shape as to transmit the image of said plungers to an observer, thus indicating the amount of pressure in a container to be checked.

9 Claims, 5 Drawing Figures

PRESSURE GAUGE OR PRESSURE INDICATOR HAVING AXIALLY-OPERATING INTERNAL MEMBERS WITH VISUAL INDICATION

BACKGROUND OF THE INVENTION

This invention relates to a pressure gauge or pressure indicator having axially-operating internal members with visual indication.

Recently, due to the strong development in the marketing of certain fire-extinguishers, made on a commercial scale and designed to be installed on motor-vehicles and motor-boats, the manufacturers of such fire extinguishers strongly need a pressure gauge which is very simple, easily and economically obtainable on a commercial scale, and which can, therefore, be mounted on said extinguishers as an indicating means for checking the conditions of the charge. For this purpose, several types of simplified pressure gauges have been developed, all based on the use of a Bourdon tubular spring member with various transmission members and a movable indicating pointer or sector and respective dial. Nevertheless, despite of any simplification in the mechanism of these components, the cost thereof has not been reduced appreciably. Practically, therefore, this problem has not yet been solved, and this led to researches to develop a pressure gauge wherein the traditional components have been omitted and which is, therefore, more simple and economical.

The article according to the invention is the output of said researches and has extremely attractive characteristics.

SUMMARY OF THE INVENTION

The pressure gauge according to the invention is characterized in that, in lieu of a Bourdon spring and transmission members associated therewith, it comprises one or more plungers, possibly cup-shaped and of different colors, which are telescopically engaged in one another and axially movable within a transparent head member, said plungers being made responsive to the pressure in the fire-extinguisher bottle or any other source of pressure by means of a membrane or a plunger provided with a toroidal gasket of "O-ring" type, and arranged so as to serve as indicator members in that they can slide in a bore which is formed in a transparent member which is mounted in a suitable position and shaped so that its bottom surface behaves as a reflecting surface that transmits to an observer the image of a portion of said plunger, and therefore the color thereof, which is exposed to the view due to the movement that has been impressed to said membrane or other transmission system by the force which is generated by the pressure of the fluid/s in the container provided with the pressure gauge of the invention.

Merely as an example, said image-transmitting transparent member can be formed by a double cone having a blind hole or bore co-axial therewith, wherein said two or more telescopically-engaged plungers can slide in co-operation with calibrated springs that, depending upon the pressure, can operate in successive periods. In accordance with the force acting thereupon, and therefore with the pressure, said calibrated spring/s will allow only a portion of one plunger to assume a position at which the image, and therefore the color, thereof will be reflected towards an observer.

In any case, regardless of the shape of said transparent member, the geometrical characteristics thereof must be calculated on the basis of the refractive index and therefore of the critical angle of the transparent material being used, so that the image of said mobile plungers is reflected towards an observer from said suitably shaped and positioned bottom surface of said transparent member. It is now apparent how the device according to the invention can visually indicate any change of pressure in a container.

The simple and reliable system according to the invention, permits a mass production of pressure indicators or pressure gauges that can be marketed at a very low price, and this feature will be maximized if the construction of each member will be appropriately studied.

BRIEF DESCRIPTION OF THE DRAWING

The accompanying drawings show, diagrammatically and as a basic non limiting example, a preferred embodiment according to the invention. In the drawings.

DESCRIPTION OF THE PREFERRED EMBODIMENT

Figure 5:
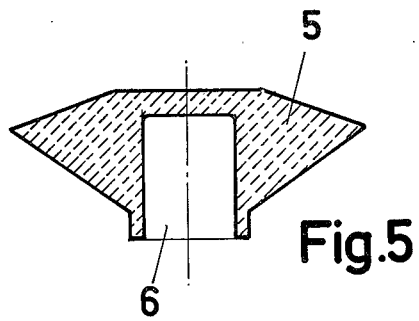
FIG. 5 is an axial section of a transparent member for transmitting the image of the plungers to an observer.

As clearly shown in the Figures and with reference thereto, the basic embodiment of the pressure gauge according to the invention comprises a body member 1 of molded plastics, having a threaded stem for connection with a nipple of an extinguisher (not shown). Said body member 1 has an upper cylindrical portion around which is engaged from the bottom a casing 2 having a top edge which is slightly protruding inwardly and having an upwardly-facing flare. Said body 1 also comprises an axial through-hole, a frusto-conical concave top 3 and an upwardly directed spacer rim or seat 4 extending from the top. As better shown in FIG. 5, said transparent member 5 is formed by a molded body of suitable transparent material of substantially bi-conical shape mating with member 1 and 2 and that can be snap-engaged thereinto by virtue of the flaring edge of casing 2. Said casing 2 can also be molded directly on the assembled body member 1 and transparent member 5, so as to form a unitary firmly-assembled member that can withstand higher pressures. In the lower portion of said transparent member 5 is formed a blind hole or bore 6 that can matingly receive said axially movable cup-shaped plungers. After snap-engagement, the lower portion rests against and is seated on said spacer rim 4. A circular conical recess 7 will thus be formed for a purpose hereinafter illustrated. As stated earlier, said transparent member 5 has a geometrical shape which is calculated on the basis of the refractive index and therefore of the critical angle of the material thereof, whereby the image of the movable plungers will be reflected from the bottom surface of transparent member to an observer, said bottom surface being spaced from any other portion by virtue of said circular recess 7 and being thus able to thoroughly fulfill its reflecting function. The image of the cup-shaped plungers, slidable within said body 1 and transparent member 5, reaches the conical bottom surface of said transparent member with a particular incidence angle depending upon the slope of said bottom surface. Inasmuch as this angle is greater than the critical angle of the transparent material, the image of the plungers will be reflected, instead of refracted, towards an observer.

Within the chamber formed by said axial through-hole in the body member 1 and by said blind hole in the reflecting member 5, two cup-shaped plungers 11, 12 of different diameters are axially and mutually movable in telescopical arrangement, and a calibrated spring 13 is placed between them. The plunger 12 has a greater diameter and is located in the bottom position so as to rest with the bottom thereof on the top surface of a piston 8 having a toroidal O-ring 9.

Figure 1:
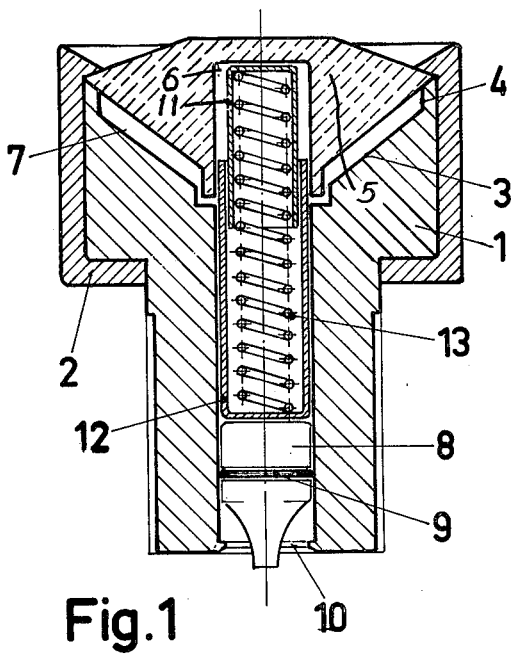
FIG. 1 is an enlarged axial section of a pressure gauge according to the invention in its rest position, that is while not submitted to pressure.
Figure 3:
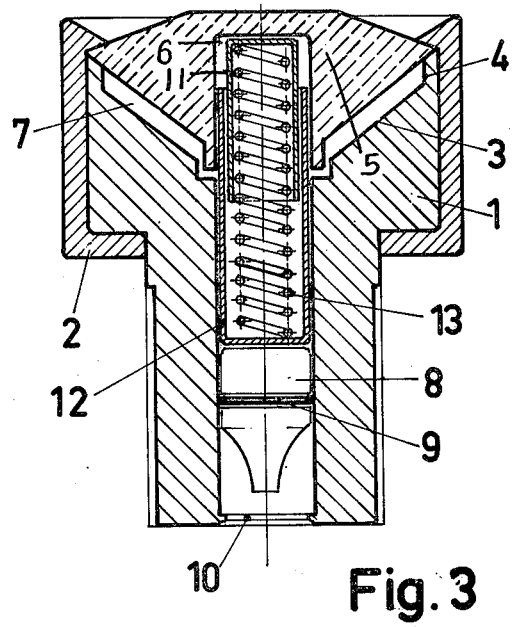
FIG. 3 is an axial section similar to FIG. 1, but while the pressure gauge is submitted to pressure and the members thereof are moved accondingly.
Figure 2:
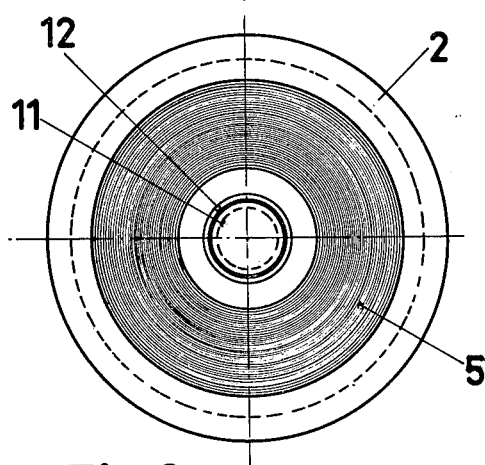
FIG. 2 is a plan view of the pressure gauge of FIG. 1 showing, from the point of view of an observer, a total amplitude monochromic indication field.
Figure 4:
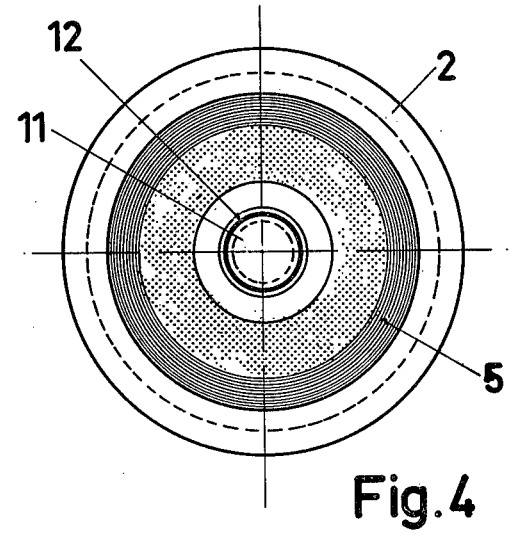
FIG. 4 is a plan view of the pressure gauge of FIG. 3, showing, from the observer point of view, two differently-colored fields, the separating line between the two fields representing the pointer for reading or checking the pressure.

As shown in FIG. 1, when the pressure gauge is in the rest position, the top plunger 11 is pushed (by the spring 13) against the top surface of said blind hole 6 and, therefore, fills completely said blind hole. Plunger 12 (still as shown in FIG. 1), having an appropriate length, does not project beyond the bottom of the conical lower surface of transparent member 5, and therefore is hidden. The two plungers are each of a different color; assuming that plunger 12 is green and plunger 11 is red, in this instance the total extent of the bottom surface of said transparent member 5 will be of a red color and this color will be shown by transparent material as shown in FIG. 2, thus indicating the absence of pressure within the bottle. However, if any pressure acts (as indicated by the arrow A) against the piston 8 with O-ring 9, the piston will be moved and will compress spring 13 so that, as shown in FIG. 3, the plunger 12 will move beyond the bottom of the conical lower surface of the transparent member 5 and will partially cover the plunger 11. As a consequence, the bottom surface of the transparent member 5 will appear of green color to an extent corresponding to the value of the pressure that caused said movement of plunger 12. This can be seen from above as diagrammatically shown in FIG. 4.

To prevent the piston 8 from overriding out, after the assembling operation the bottom orifice of the axial bore in the body member 1 is swaged up to form a retaining rim 10.

As stated above, the pressure gauge hereinbefore described relates to a basic embodiment to carry into effect the principle of the invention, i.e. two differently colored plungers telescopically axially slidable and co-operating with a transparent member the geometrical shape of which is calculated so as to transmit the image of the plungers to an observer. Obviously, many changes are possible, and for example the invention can also be carried into effect with a telescopic assembly comprising more than two plungers co-operating with a plurality of differently calibrated springs that can operate, according to the pressure, successively after one another. Also the indicating means, instead of colored fields, can comprise inscriptions (for example: "FULL"-"EMPTY") or particular figures printed in lieu of said colors in the portion of the plungers 11, 12 which will be reflected, so as to be read out easily.

Moreover, still within the invention, the O-ring 9 can be arranged, rather than on the piston 8, in a suitable seat formed in the periphery of the indicating plunger 12, the latter being thus directly operated by the pressure. Moreover, still within the invention, said piston 8 with O-ring 9 can be replaced by a membrane that, upon installation of the pressure gauge on a pressurized bottle or container, is placed between the lower end of the threaded stem of body member 1 and the bottom of the respective threaded seat on the bottle or container, said bottom being shaped conformingly. Said membrane can have different shapes, for example a cup-shape with a peripheral rim serving as a toroidal gasket; obviously, said membrane must be molded from flexible and tough material, such as rubber or any other suitable material having similar characteristics.

Obviously, many changes, modifications and improvements can be made in the embodiments hereinbefore shown and described, still within tha basic principles of the invention.

We claim:

1. A pressure indicator comprising a hollow main body, said main body defining a lower neck portion having a circular channel centrally defined therein and means operable for pressure-tight attachment of said indicator to a vessel, and an upper portion, an upper rim portion of said upper portion defining a seat;

a circular transparent member having an upper surface and a convex conical lower surface with a blind hole centrally opening on said lower surface so as to define a closed axial chamber in said transparent member, said chamber registering with said neck portion channel, at least a portion of said lower conical surface being seated on said main body seat;

an outer casing disposed about the upper portion of said main body and operable to retain said transparent member in seated, pressure-tight relationship with said main body; and pressure indicating means disposed in said channel and said chamber, said pressure indicating means comprising an upper cup-shaped plunger, the closed end of which is disposed in said transparent member chamber, an opposed lower cup-shaped plunger telescopically mounted over said upper plunger and slidably disposed in said main body channel, the outer surface of said lower plunger being visually distinctive from that of said upper plunger, and spring means disposed between said plungers and opposing pressure forces communicated to said lower plunger.

2. A pressure indicator according to claim 1 wherein said main body seats said transparent member only about the outer perimeter of said lower surface so as to define an inner circular recess between said main body and said transparent member.

3. A pressure indicator according to claim 1 wherein the angle of said lower conical surface relative to the axis of said plungers is such as to reflect towards said upper surface of the transparent member, said visually distinctive lower plunger upon entrance thereof into said chamber.

4. A pressure indicator according to claim 3 wherein under no load conditions said lower plunger is disposed in said main body channel at a position sufficiently below said lower conical surface of said transparent member so as not to be reflected.

5. A pressure indicator according to claim 1 having pressure responsive means disposed in said channel below and acting upon said lower plunger.

6. A pressure indicator according to claim 5 wherein said pressure responsive means includes a piston slidably disposed in said channel acting on said lower plunger.

7. A pressure indicator according to claim 6 wherein said piston includes a toroidal O-ring engaging the wall of said channel.

8. A pressure indicator according to claim 7 wherein said lower neck portion extends into said channel so as to retain said piston therein.

9. A pressure indicator according to claim 1 wherein the outer surface of said lower plunger is visually distinctive from said upper plunger by reason of color.

* * * * *